United States Patent
Li et al.

(10) Patent No.: US 11,309,716 B2
(45) Date of Patent: Apr. 19, 2022

(54) HIGH EFFICIENCY POWER CONVERTING APPARATUS

(71) Applicant: Nuvolta Technologies (Hefei) Co., Ltd., Hefei (CN)

(72) Inventors: Zeng Li, Shanghai (CN); Jinbiao Huang, Nashua, NH (US); Xintao Wang, Pleasanton, CA (US)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 52 days.

(21) Appl. No.: 16/950,223

(22) Filed: Nov. 17, 2020

(65) Prior Publication Data

US 2021/0075223 A1    Mar. 11, 2021

Related U.S. Application Data

(62) Division of application No. 15/985,227, filed on May 21, 2018, now Pat. No. 10,868,429.

(51) Int. Cl.
| | |
|---|---|
| *H02J 7/00* | (2006.01) |
| *H02J 7/14* | (2006.01) |
| *H02M 3/07* | (2006.01) |
| *H02M 7/219* | (2006.01) |
| *H02J 7/02* | (2016.01) |
| *H02J 50/12* | (2016.01) |

(52) U.S. Cl.
CPC ............... *H02J 7/00* (2013.01); *H02J 7/025* (2013.01); *H02J 50/12* (2016.02); *H02M 3/07* (2013.01); *H02M 7/219* (2013.01); *H02J 2207/20* (2020.01)

(58) Field of Classification Search
USPC ........................................................ 320/134
See application file for complete search history.

(56) References Cited

U.S. PATENT DOCUMENTS

| | | | |
|---|---|---|---|
| 11,121,576 B2 * | 9/2021 | Li | H02J 7/025 |
| 2009/0002793 A1 | 1/2009 | Usui | |
| 2015/0028691 A1 | 1/2015 | Yamauchi et al. | |
| 2015/0364928 A1 | 12/2015 | Yen et al. | |
| 2017/0018973 A1 | 1/2017 | Murayama et al. | |
| 2017/0093168 A1 | 3/2017 | Von Novak, III et al. | |
| 2017/0038686 A1 | 11/2017 | Pan et al. | |
| 2018/0138735 A1 * | 5/2018 | Maalouf | H04B 5/0037 |
| 2018/0309315 A1 | 10/2018 | Der et al. | |
| 2019/0103766 A1 | 4/2019 | Von Novak, III et al. | |
| 2019/0260232 A1 * | 8/2019 | Liu | H02M 3/33569 |
| 2020/0343774 A1 * | 10/2020 | Liu | H02J 50/12 |
| 2020/0358305 A1 * | 11/2020 | Li | H02J 7/0063 |
| 2020/0366120 A1 * | 11/2020 | Yuan | H02J 7/02 |
| 2020/0412237 A1 * | 12/2020 | Dai | H02M 3/155 |

(Continued)

*Primary Examiner* — Alexis B Pacheco
(74) *Attorney, Agent, or Firm* — Slater Matsil, LLP

(57) ABSTRACT

A system includes a transmitter circuit coupled to an input power source, a transmitter coil coupled to the transmitter circuit, a receiver coil magnetically coupled to the transmitter coil, a rectifier coupled to the receiver coil and configured to convert an alternating current voltage into a direct current voltage, and a high efficiency power converter comprising a first stage and a second stage connected in cascade between the rectifier and a battery, wherein the first stage is configured to charge the battery, and the second stage is configured to provide isolation between the first stage and the battery.

20 Claims, 10 Drawing Sheets

(56) References Cited

U.S. PATENT DOCUMENTS

2021/0083520 A1* 3/2021 Chen .................. H02M 3/3376
2021/0194266 A1* 6/2021 Song .................... H02M 3/072
2021/0273445 A1* 9/2021 Liu ........................ H02M 1/32

* cited by examiner

HIGH EFFICIENCY POWER CONVERTING APPARATUS

PRIORITY CLAIM AND CROSS-REFERENCE

This application is a divisional of U.S. patent application Ser. No. 15/985,227, filed on May 21, 2018, which application is hereby incorporated herein by reference.

TECHNICAL FIELD

The present invention relates to a power converter, and, in particular embodiments, to a high efficiency power converter in a receiver of a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As the power of the wireless power transfer system goes higher, there may be a need for achieving a high-efficiency wireless power transfer between the transmitter and the receiver. More particularly, achieving a high efficiency wireless power transfer under various input and output conditions (e.g., different load currents and/or different rated input voltages of the receiver) has become a significant issue, which presents challenges to the system design of the wireless power transfer system.

It would be desirable to have a high performance power receiver exhibiting good behaviors such as high efficiency under a variety of input and output conditions.

SUMMARY

These and other problems are generally solved or circumvented, and technical advantages are generally achieved, by preferred embodiments of the present disclosure which provide a high efficiency power converter in a receiver of a wireless power transfer system.

In accordance with an embodiment, a system comprises a transmitter circuit coupled to an input power source, a transmitter coil coupled to the transmitter circuit, a receiver coil magnetically coupled to the transmitter coil, a rectifier coupled to the receiver coil and configured to convert an alternating current voltage into a direct current voltage, and a high efficiency power converter comprising a first stage and a second stage connected in cascade between the rectifier and a battery, wherein the first stage is configured to charge the battery, and the second stage is configured to provide isolation between the first stage and the battery.

In accordance with another embodiment, a method comprises detecting an output voltage of a high efficiency power converter, wherein the high efficiency power converter comprises a first stage and a second stage connected in cascade, applying a current control mode to the first stage and configuring an output current of the first stage within a predetermined current range when the output voltage is less than a predetermined output voltage threshold and applying a voltage control mode to the first stage and configuring an output voltage of the first stage within a predetermined voltage range when the output voltage is greater than the predetermined output voltage threshold.

In accordance with yet another embodiment, a system comprises a receiver coil configured to be magnetically coupled to a transmitter coil, a rectifier connected to the receiver coil and a high efficiency converter connected between the rectifier and a battery, wherein the high efficiency converter comprises a first stage and a second stage connected in cascade, and wherein the first stage configured to operate in various operating modes for charging the battery and the second stage configured to provide isolation between the first stage and the battery.

An advantage of an embodiment of the present disclosure is a high efficiency power converter in a receiver of a wireless power transfer system for charging a battery.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a high efficiency power converter operating in different operating modes for increasing efficiency and performance of a wireless power transfer system. The disclosure may also be applied, however, to a variety of power systems. Hereinafter, various embodiments will be explained in detail with reference to the accompanying drawings.

Figure 1:
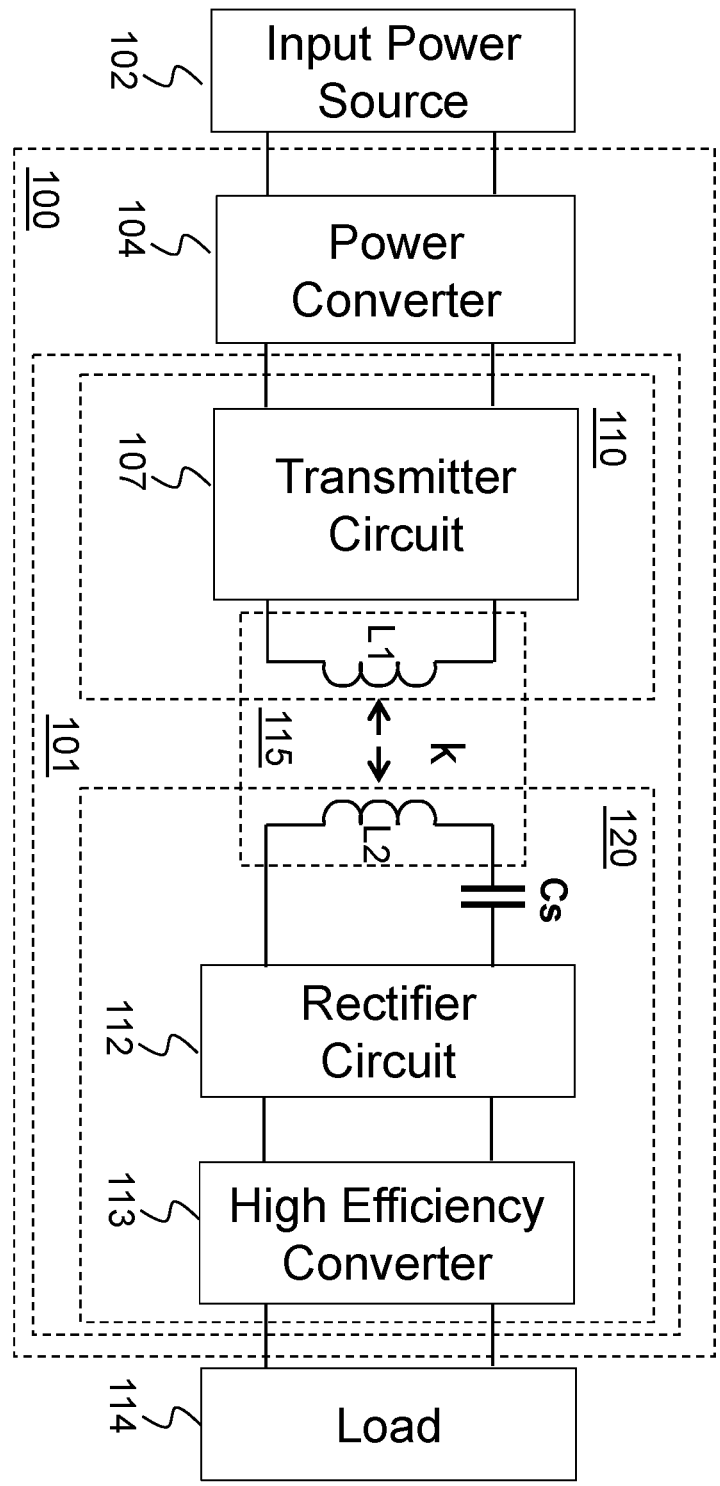
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. In some embodiments, the power converter 104 is employed to further improve the performance of the wireless power transfer system 100. In alternative embodiments, the power converter 104 is an optional element. In other words, the wireless power transfer device 101 may be connected to the input power source 102 directly.

The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier 112 and a high efficiency power converter 113 connected in cascade. As shown in FIG. 1, the resonant capacitor Cs is connected in series with the receiver coil L2 and further connected to the inputs of the rectifier 112. The outputs of the rectifier 112 are connected to the inputs of the high efficiency power converter 113. The outputs of the high efficiency power converter 113 are coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor Cs as shown in FIG. 1. Throughout the description, the secondary resonant capacitor Cs may be alternatively referred to as a receiver resonant capacitor.

The rectifier 112 converts an alternating polarity waveform received from the output of the receiver coil L2 to a single polarity waveform. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The high efficiency power converter 113 is coupled between the rectifier 112 and the load 114. The high efficiency power converter 113 is a non-isolated power converter. The high efficiency power converter 113 comprises a first power stage and a second power stage connected in cascade. The first power stage is configured to operate in different modes for efficiently charging the load 114 (e.g., a rechargeable battery shown in FIG. 3). The second power stage is configured as a voltage divider or an isolation switch. The block diagram of the high efficiency power converter 113 will be described below with respect to FIG. 2. The detailed configuration (e.g., different operating modes and their corresponding converter configurations) of the high efficiency power converter 113 will be described below with respect to FIGS. 3-6.

In some embodiments, the input voltage of the high efficiency power converter 113 is in a range from about 9 V to about 22 V. The output voltage of the high efficiency power converter 113 is in a range from about 5 V to about 10 V. One advantageous feature of having the high efficiency power converter 113 is that a higher output voltage (e.g., 22 V) can be achieved at the output of the rectifier 112. Such a higher output voltage helps to lower down the current flowing through the receiver coil L2, thereby improving the efficiency of the power receiver 120. For example, the efficiency of a receiver having the high efficiency power converter 113 can be improved by at least 7% compared to a conventional implementation of the receiver.

Figure 2:
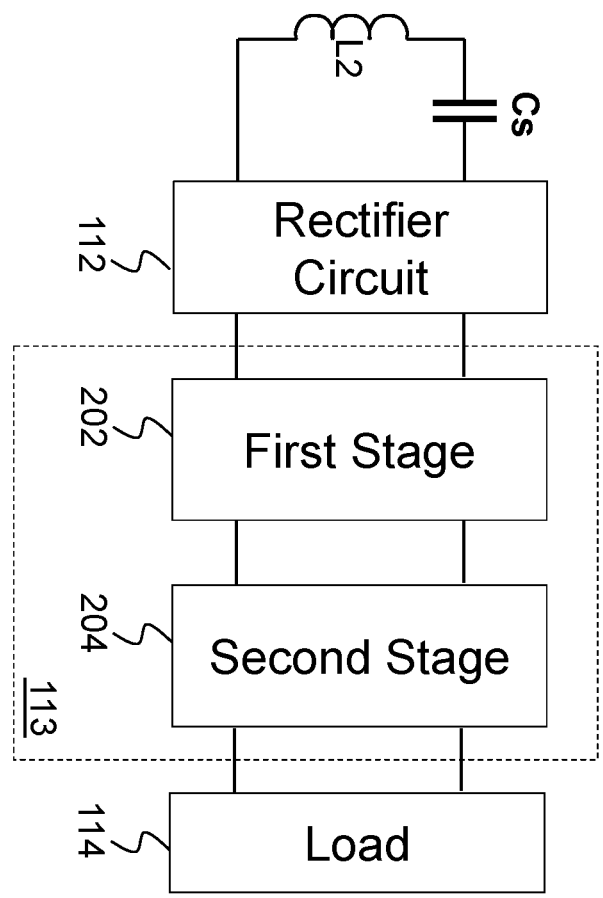
FIG. 2 illustrates a block diagram of the receiver shown in FIG. 1 in accordance with various embodiments of the present disclosure.

FIG. 2 illustrates a block diagram of the receiver shown in FIG. 1 in accordance with various embodiments of the present disclosure. In some embodiments, the high efficiency power converter 113 comprises a first stage 202 and a second stage 204 connected in cascade. As shown in FIG. 2, the inputs of the first stage 202 are connected to the outputs of the rectifier 112. The inputs of the second stage 204 are connected to the outputs of the first stage 202. The outputs of the second stage 204 are connected to the load 114.

In some embodiments, the first stage 202 is implemented as a step-down power converter (known as buck converter). The step-down converter is configured to operate in either a voltage mode or a current mode depending different operating conditions and design needs. The detailed structure of the step-down converter will be described below with respect to FIG. 3. In alternative embodiments, the first stage 202 is implemented as a four-switch buck-boost power converter. The four-switch buck-boost power converter is configured to operate in either a buck converter mode or a boost converter mode depending different operating conditions and design needs. The detailed structure of the four-switch buck-boost power converter will be described below with respect to FIG. 6. Furthermore, the first stage 202 may be implemented as a hybrid power converter. The hybrid power converter is configured as a buck converter or a hybrid converter depending different operating conditions and design needs. The detailed structure and the operating principle of the hybrid power converter will be described below with respect to FIG. 5.

In some embodiments, the second stage 204 is implemented as a charge pump power converter. The charge pump power converter is configured as a high efficiency voltage divider. The detailed structure of the charge pump power converter will be described below with respect to FIG. 3. In alternative embodiments, the second stage 204 is implemented as an isolation switch. The isolation switch is formed by two back-to-back connected power switches. The detailed structure of the isolation switch will be described below with respect to FIG. 4.

Figure 3:
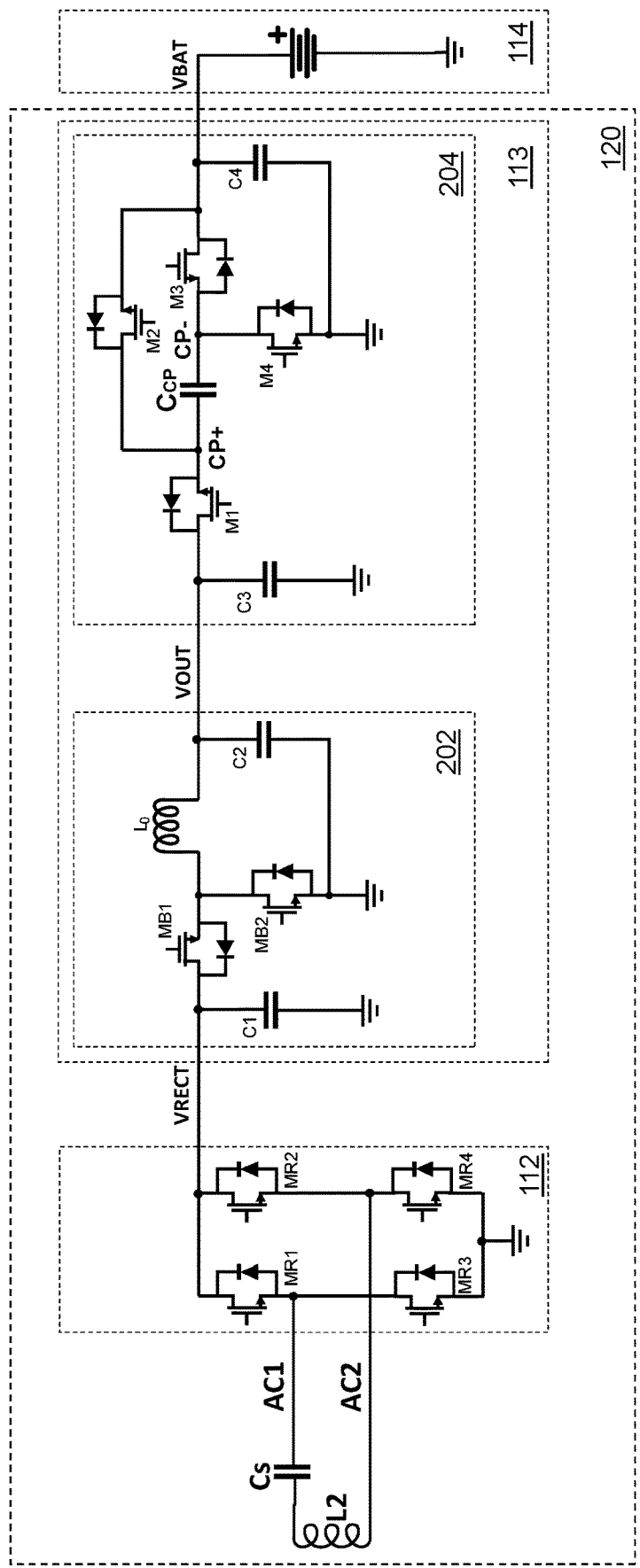
FIG. 3 illustrates a schematic diagram of a first implementation of the receiver shown in FIG. 1 in accordance with various embodiments of the present disclosure.

FIG. 3 illustrates a schematic diagram of a first implementation of the receiver shown in FIG. 1 in accordance with various embodiments of the present disclosure. The power receiver 120 comprises the receiver coil L2, the receiver resonant capacitor Cs, the rectifier 112 and the high efficiency power converter 113. As shown in FIG. 3, the receiver resonant capacitor Cs, the rectifier 112 and the high efficiency power converter 113 are connected in cascade between the receiver coil L2 and the load 114. In some embodiments, the load 114 is a rechargeable battery. Throughout the description, the load 114 may be alternatively referred to as a battery.

In some embodiments, the rectifier 112 is implemented as a full-wave rectifier. The rectifier 112 includes four switching elements, namely MR1, MR2, MR3 and MR4. As shown in FIG. 3, the switching elements MR1 and MR3 are connected in series between the output terminal of the rectifier 112 and ground. Likewise, the switching elements MR2 and MR4 are connected in series between the output terminal of the rectifier 112 and ground. As shown in FIG. 3, the common node AC1 of the switching elements MR1 and MR3 is coupled to a first input terminal of the receiver coil L2 through the receiver resonant capacitor Cs. The common node AC2 of the switching elements MR2 and MR4 is coupled to a second input terminal of the receiver coil L2.

According to some embodiments, the switching elements MR1, MR2, MR3 and MR4 are implemented as MOSFET or MOSFETs connected in parallel, any combinations thereof and/or the like. According to alternative embodiments, the switching elements (e.g., switch MR1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-wave rectifier (e.g., full-wave rectifier 112 shown in FIG. 3), the implementation of the power receiver 120 shown in FIG. 3 may have many variations, alternatives, and modifications. For example, half-wave rectifiers may be alternatively employed.

In sum, the full-wave rectifier 112 illustrated herein is limited solely for the purpose of clearly illustrating the inventive aspects of the various embodiments. The present disclosure is not limited to any particular power topology.

It should further be noted that while FIG. 3 illustrates four switches MR 1-MR 4, various embodiments of the present disclosure may include other variations, modifications and alternatives. For example, additional switching elements may be connected in parallel with each switch of the full-wave rectifier 112. The additional switching elements help to improve the efficiency of the rectifier 112.

It should further be noted the rectifier structure shown in FIG. 3 is merely an example. One person skilled in the art will recognize many alternatives, variations and modification. For example, the four switches MR1, MR2, MR3 and MR4 may be replaced by four diodes.

The output of the rectifier 112 is connected to a capacitor C1. The capacitor C1 functions as an output capacitor of the rectifier 112 and an input capacitor of the high efficiency power converter 113. The capacitor C1 is employed to attenuate noise and provide a steady output voltage at the output of the rectifier 112.

The high efficiency power converter 113 comprises the first stage 202 and the second stage 204 connected in cascade as shown in FIG. 3. The first stage 202 is a step-down power converter (also known as a buck converter). The first stage 202 includes a first switch MB1, a second switch MB2, an inductor Lo and an output capacitor C2. As shown in FIG. 3, the first switch MB1 and the second switch MB2 are connected in series between the output VRECT of the rectifier 112 and ground. The inductor Lo is connected between the common node of the first switch MB1 and the second switch MB2, and the output capacitor C2. Throughout the description, the first switch MB1 is alternatively referred to as a high-side switch of the first stage 202. The second switch MB2 is alternatively referred to as a low-side switch of the first stage 202.

In some embodiments, both the first switch MB1 is implemented and the second switch MB2 are implemented as an n-type transistors as shown in FIG. 3. The gate of the first switch MB1 and the gate of the second switch MB2 are configured to receive gate drive signals generated by a controller (not shown).

It should be noted that the first stage 202 shown in FIG. 3 is merely an example, which should not unduly limit the scope of the claims. One of ordinary skill in the art would recognize many variations, alternatives, and modifications. For example, the first switch MB1 may be implemented as a p-type transistor.

In operation, the first stage 202 functions as a charging apparatus for charging the battery 114. More particularly, during the process of charging the battery 114, the first stage 202 may be configured to operate in a current control mode in which the resolution of the current regulation is equal to or less than about 400 mA. Furthermore, the first stage 202 may be configured to operate in a voltage control mode in which the resolution of the voltage regulation is equal to or less than about 40 mV.

The second stage 204 comprises an input capacitor C3, a first switch M1, a capacitor $C_{CP}$, a second switch M2, a third switch M3, a fourth switch M4 and an output capacitor C4. The first switch M1, the capacitor $C_{CP}$ and the third switch M3 are connected in series between the output terminal VOUT of the first stage 202 and the battery 114. A common node of the first switch M1 and the capacitor $C_{CP}$ is denoted as CP+ as shown in FIG. 3. Likewise, a common node of the third switch M3 and the capacitor $C_{CP}$ is denoted as CP−. A common node of the second switch M2 and the output capacitor C4 is denoted as VBAT. As shown in FIG. 3, the second switch M2 is connected between CP+ and VBAT. The fourth switch M4 is connected between CP− and ground.

In some embodiments, the second stage 204 functions as a charge pump power converter. The charge pump power converter operates in two different phases. During the first phase of the charge pump mode, switches M1 and M3 are turned on, and switches M2 and M4 are turned off. Since switches M1 and M3 are turned on, a first conductive path is established between VOUT and VBAT. The first conductive path is formed by switch M1, the charge pump capacitor $C_{CP}$ and switch M3. The current flows from VOUT to VBAT through the first conductive path. During the first phase of the charge pump mode, the charge pump capacitor $C_{CP}$ is charged and energy is stored in the charge pump capacitor $C_{CP}$ accordingly.

During the second phase of the charge pump mode, switches M1 and M3 are turned off, and switches M2 and M4 are turned on. Since switches M2 and M4 are turned on, a second conductive path is established. The second conductive path is formed by switch M4, the charge pump capacitor $C_{CP}$ and switch M2. During the second phase of the charge pump mode, the current discharges the charge pump capacitor $C_{CP}$ and the energy stored in the charge pump capacitor $C_{CP}$ decreases accordingly.

In some embodiments, the input voltage VRECT is in a range from about 9 V to about 22 V. The output voltage is about 3.8 V. The charge pump converter functions as a voltage divider. More particularly, by controlling the on/off time of the switches M1-M4, the output voltage VBAT of the charge pump power converter is equal to one half of the input voltage of the charge pump power converter.

Figure 4:
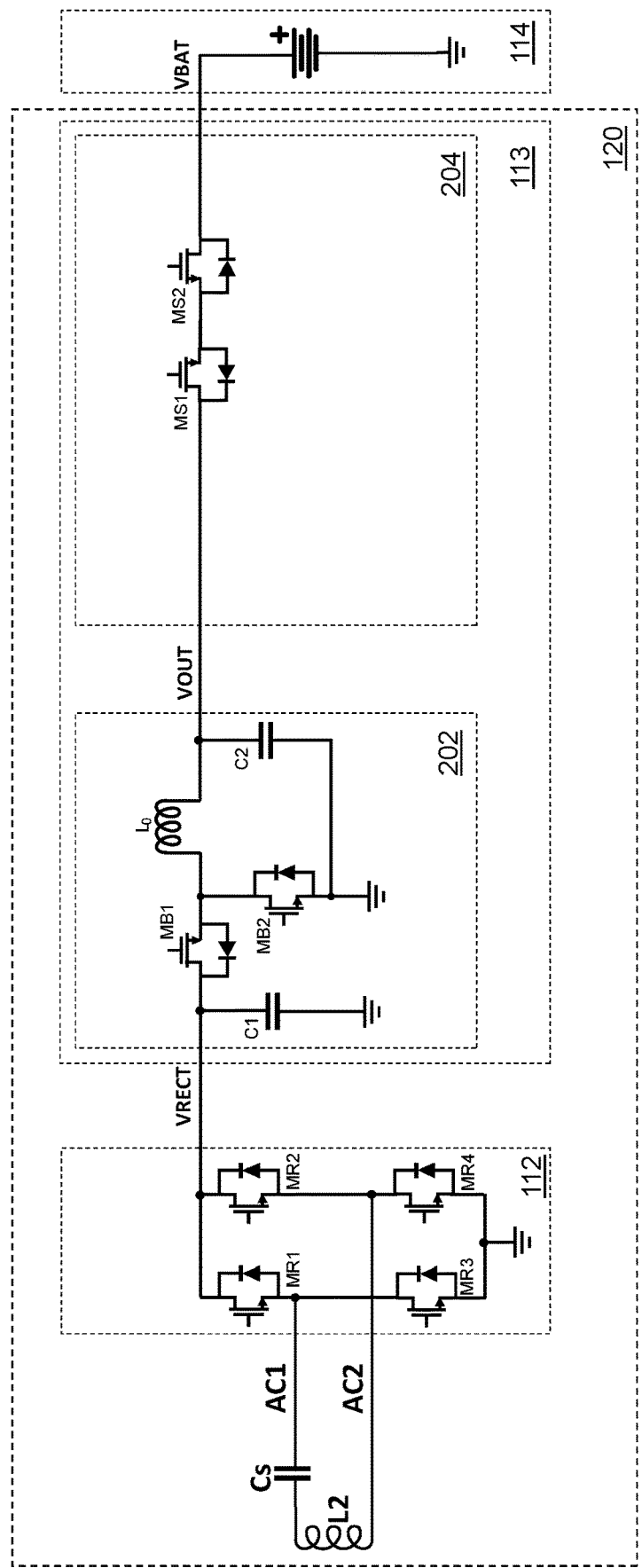
FIG. 4 illustrates a schematic diagram of a second implementation of the receiver shown in FIG. 1 in accordance with various embodiments of the present disclosure.

FIG. 4 illustrates a schematic diagram of a second implementation of the receiver shown in FIG. 1 in accordance with various embodiments of the present disclosure. The receiver 120 shown in FIG. 4 is similar to that shown in FIG. 3 except that the second stage 204 of the high efficiency power converter 113 is implemented as an isolation switch. As shown in FIG. 4, the isolation switch includes a first switch MS1 and a second switch MS2. The first switch MS1 and the second switch MS2 are back-to-back connected, thereby providing isolation between the first stage 202 and the battery 114.

One advantageous feature of having an isolation switch as the second stage is that the system configuration shown in FIG. 4 is suitable for high voltage applications such as a rechargeable battery including two battery cells connected in series.

In some embodiments, the input voltage VRECT is in a range from about 9 V to about 22 V. The output voltage is in a range from about 7.6 V to about 7.7 V. The isolation switch provides a direct conduction path between the first power stage 202 and the battery 114. The battery 114 may be formed by two battery cells connected in series.

Figure 5:
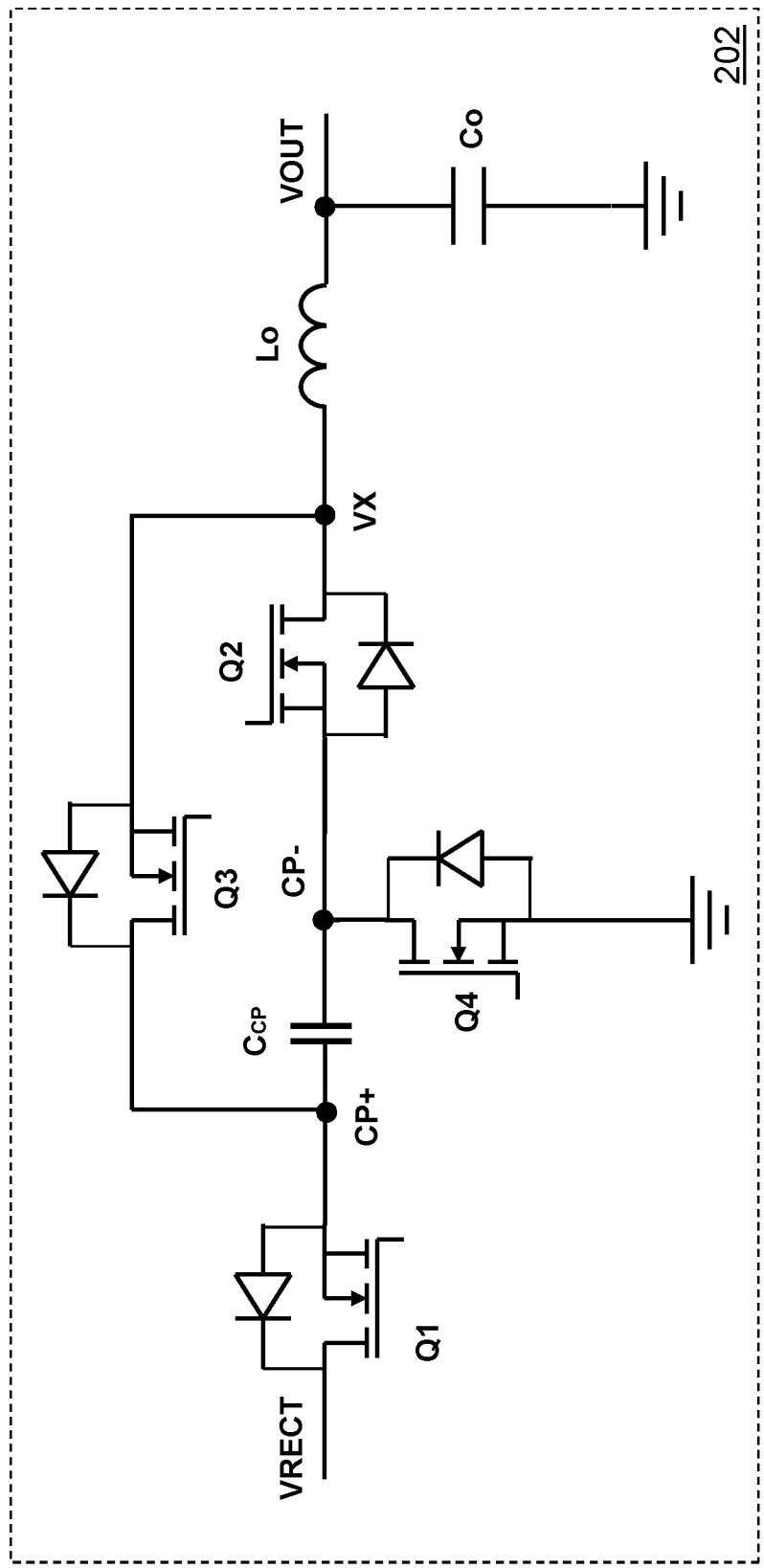
FIG. 5 illustrates a schematic diagram of a hybrid converter in accordance with various embodiments of the present disclosure.

FIG. 5 illustrates a schematic diagram of a hybrid converter in accordance with various embodiments of the present disclosure. In some embodiments, the first stage 202 shown in FIG. 2 can be implemented as a hybrid converter as shown in FIG. 5. It should be noted that the hybrid converter shown in FIG. 5 can be combined with any implementations of the second stage 204. For example, when the first stage 202 is implemented as a hybrid converter, the second stage 204 can be any suitable implementations such as the charge pump power converter shown in FIG. 3, the isolation switch shown in FIG. 4 and any combinations thereof.

As shown in FIG. 5, the hybrid converter comprises a first switch Q1, a capacitor $C_{CP}$, a second switch Q2, a third switch Q3, a fourth switch Q4, an output inductor Lo and an output capacitor Co. As shown in FIG. 5, the output inductor Lo and the output capacitor Co form an output filter. The first switch Q1, the capacitor $C_{CP}$ and the second switch Q2 are connected in series between an input terminal VRECT and the output filter. A common node of the first switch Q1 and the capacitor $C_{CP}$ is denoted as CP+ as shown in FIG. 5. Likewise, a common node of the second switch Q2 and the capacitor $C_{CP}$ is denoted as CP−. A common node of the second switch Q2 and the output filter is denoted as VX. As shown in FIG. 5, the third switch Q3 is connected between CP+ and VX. The fourth switch Q4 is connected between CP− and ground.

In some embodiments, the capacitor $C_{CP}$ functions as a charge pump capacitor. Throughout the description, the capacitor $C_{CP}$ is alternatively referred to as the charge pump capacitor $C_{CP}$.

In accordance with an embodiment, the switches (e.g., switches Q1-Q4) may be metal oxide semiconductor field-effect transistor (MOSFET) devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted while FIG. 5 shows the switches Q1-Q4 are implemented as single n-type transistors, a person skilled in the art would recognize there may be many variations, modifications and alternatives. For example, depending on different applications and design needs, the switches Q1-Q4 may be implemented as p-type transistors. Furthermore, each switch shown in FIG. 5 may be implemented as a plurality of switches connected in parallel. Moreover, a capacitor may be connected in parallel with one switch to achieve zero voltage switching (ZVS)/zero current switching (ZCS).

The hybrid converter may operate in three different operating modes, namely a hybrid mode, a charge pump mode and a buck mode. When the hybrid converter is employed as the first stage 202. The hybrid converter may only operate in the charge pump mode or the buck mode.

In the hybrid mode, the hybrid converter operates in four different phases. In each phase, the current flowing through the output inductor Lo may ramp up or down depending on different combinations of the input voltage VRECT, the voltage across the charge pump capacitor $C_{CP}$ and the output voltage VOUT. In the hybrid mode, the voltage of the hybrid converter can be regulated to a predetermined voltage.

In the buck mode, the hybrid converter operates in two different phases. The second switch Q2 and the third switch Q3 are always-on. As a result, the charge pump capacitor $C_{CP}$ is shorted and not part of the operation of the buck mode. In each phase, the current flowing through the output inductor Lo may ramp up or down depending on different combinations of the input voltage VRECT and the output voltage VOUT.

Figure 6:
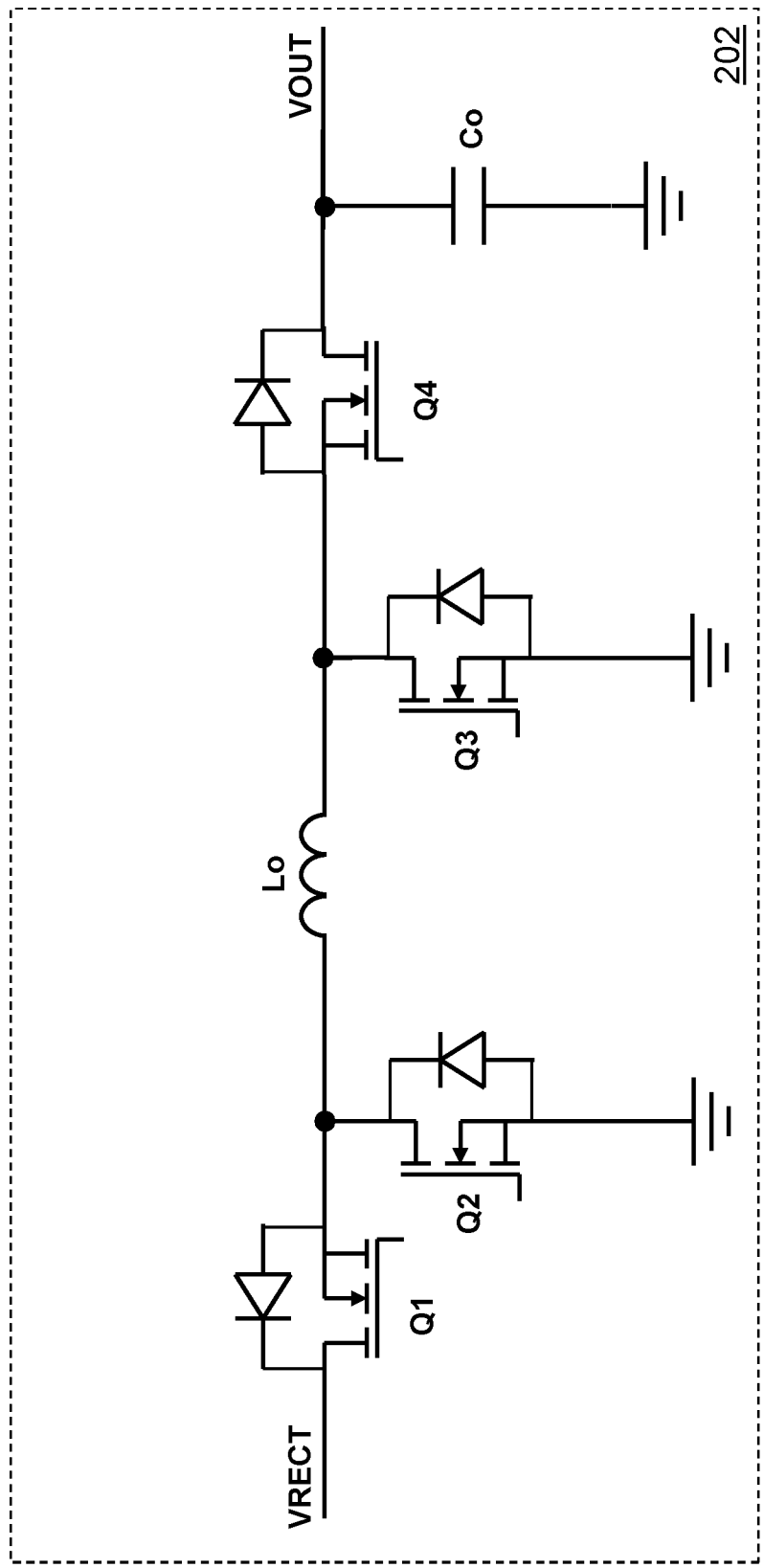
FIG. 6 illustrates a schematic diagram of a four-switch buck-boost converter in accordance with various embodiments of the present disclosure.

FIG. 6 illustrates a schematic diagram of a four-switch buck-boost converter in accordance with various embodiments of the present disclosure. In some embodiments, the first stage 202 shown in FIG. 2 can be implemented as a four-switch buck-boost converter as shown in FIG. 6. It should be noted that the four-switch buck-boost converter shown in FIG. 6 can be combined with any implementations of the second stage 204. For example, when the first stage 202 is implemented as a four-switch buck-boost converter, the second stage 204 can be any suitable implementations such as the charge pump power converter shown in FIG. 3, the isolation switch shown in FIG. 4 and any combinations thereof.

As shown in FIG. 6, the buck-boost converter comprises a first high-side switch Q1, a first low-side switch Q2, a second low-side switch Q3, a second high-side switch Q4 and an inductor Lo. The first high-side switch Q1 and the first low-side switch Q2 are connected in series between VRECT and ground. The second high-side switch Q4 and the second low-side switch Q3 are connected in series between VOUT and ground. The inductor Lo is coupled between the common node of the first high-side switch Q1 and the first low-side switch Q2, and the common node of the second high-side switch Q4 and the second low-side switch Q3 as shown in FIG. 6.

The buck-boost converter may be divided into two portions, namely a buck converter portion and a boost converter portion. The buck converter portion may comprise the first high-side switch Q1 and the first low-side switch Q2. The buck converter portion and the inductor Lo may function as a step-down converter when the second high-side switch Q4 is always on and the second low-side switch Q3 is always off. Under such a configuration, the buck-boost converter operates in a buck mode.

The boost converter portion of the buck-boost converter may comprise the second high-side switch Q4 and second low-side switch Q3. The boost converter portion and the inductor Lo may function as a step-up converter when the first high-side switch Q1 is always on and the first low-side switch Q2 is always off. Under such a configuration, the buck-boost converter operates in a boost mode. Furthermore, the buck-boost converter operates in a pass-through mode when the high-side switches Q1 and Q4 are always on, and the low-side switches Q2 and Q3 are always off.

The switches (e.g., the first high-side switch Q1) shown in FIG. 6 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should further be noted that while FIG. 6 illustrates four switches Q1, Q2, Q3, and Q4, various embodiments of the present disclosure may include other variations, modifications and alternatives. For example, the first low-side switch Q2 may be replaced by a freewheeling diode and/or the like. The second high-side switch Q4 may be replaced by a rectifier diode and/or the like.

Based upon different application needs, the buck-boost converter may be configured to operate in three different operating modes, namely the buck mode, the boost mode and the pass-through mode.

Figure 7:
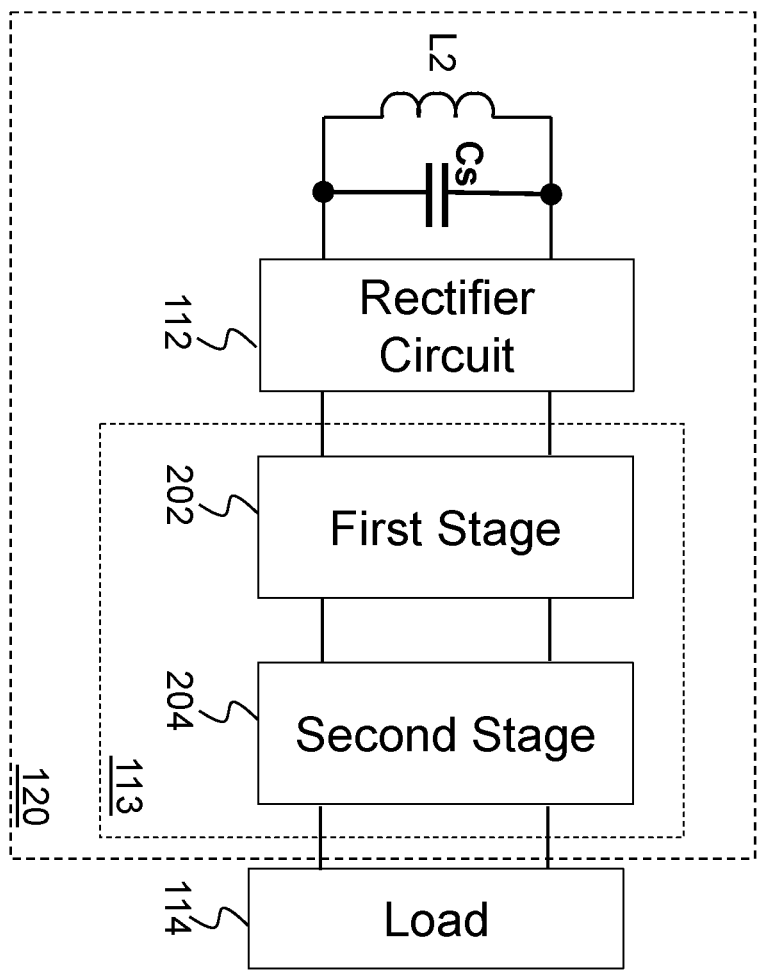
FIG. 7 illustrates a block diagram of a third implementation of the receiver shown in FIG. 1 in accordance with various embodiments of the present disclosure.

FIG. 7 illustrates a block diagram of a third implementation of the receiver shown in FIG. 1 in accordance with various embodiments of the present disclosure. The receiver 120 shown in FIG. 7 is similar to that shown in FIG. 2 except that the receiver resonant capacitor Cs is connected in parallel with the receiver coil L2. The structures and the operating principles of the rectifier 112 and the high efficiency power converter 113 have been described above in detail with respect to FIGS. 3-6, and hence are not discussed herein again to avoid unnecessary repetition.

Figure 8:
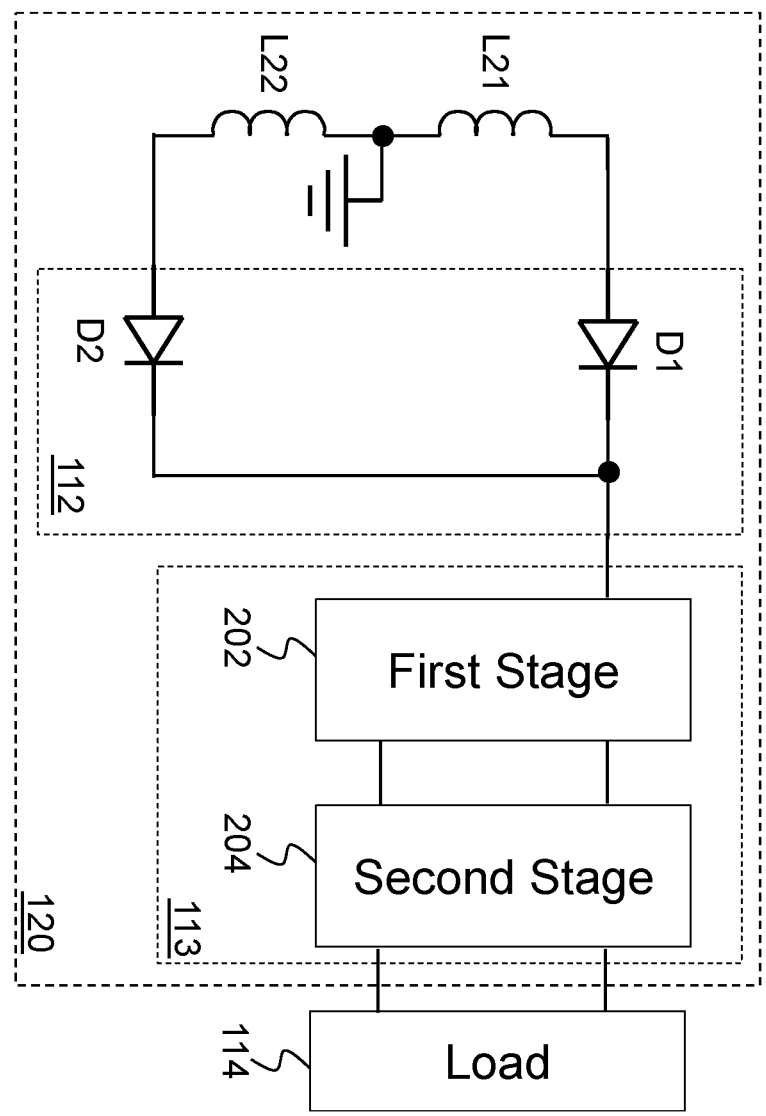
FIG. 8 illustrates a block diagram of a fourth implementation of the receiver shown in FIG. 1 in accordance with various embodiments of the present disclosure.

FIG. 8 illustrates a block diagram of a fourth implementation of the receiver shown in FIG. 1 in accordance with various embodiments of the present disclosure. The receiver 120 shown in FIG. 8 is similar to that shown in FIG. 2 except that the receiver coil L2 has been replaced by two coils L21 and L22. Furthermore, the switches of the rectifier 112 have been replaced by two diodes D1 and D2 as shown in FIG. 8.

It should be noted the rectifier structure shown in FIG. 8 is merely an example. One person skilled in the art will recognize many alternatives, variations and modification. For example, the two diodes D1 and D2 may be replaced by two switching elements.

Figure 9:
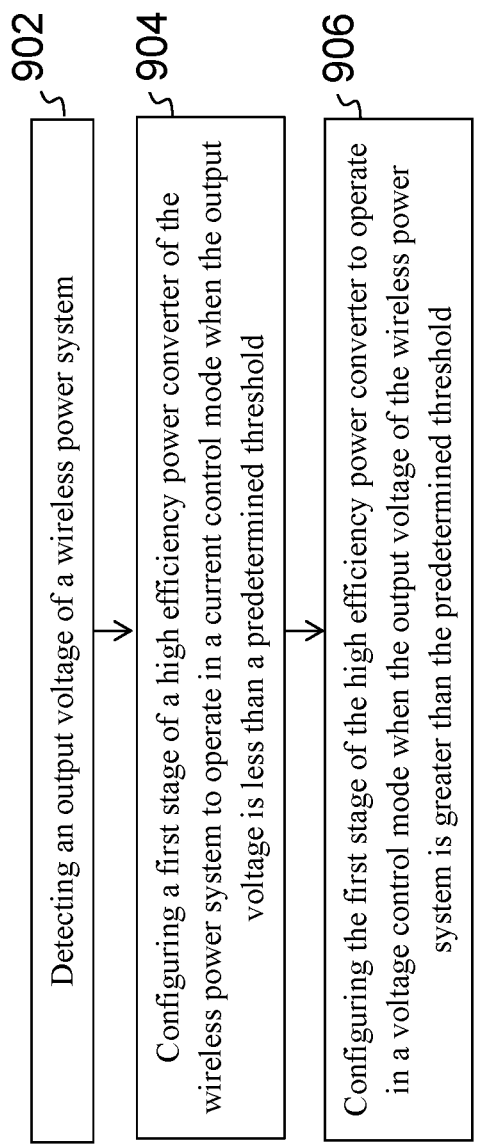
FIG. 9 illustrates a flow chart of applying a battery charging control mechanism to the high efficiency converter shown in FIG. 3 in accordance with various embodiments of the present disclosure.

FIG. 9 illustrates a flow chart of applying a battery charging control mechanism to the high efficiency converter shown in FIG. 3 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

At step 902, an output voltage of a wireless power system is detected by a suitable sensing apparatus or a plurality of sensing devices. The detected voltage is processed by a controller. In particular, the detected voltage is compared with a predetermined voltage threshold.

The receiver of the wireless power system comprises a high efficiency power converter. The high efficiency power converter comprises a first stage 202 and a second stage 204 connected in cascade. The first stage 202 is employed to charge a battery and the second stage 204 is employed to provide isolation between the first stage 202 and the battery.

At step 904, the first stage 202 of the high efficiency power converter is configured to operate in a current control mode to charge the battery when the output voltage of the wireless power system is less than the predetermined voltage threshold.

At step 906, the first stage 202 of the high efficiency power converter is configured to operate in a voltage control mode to charge the battery when the output voltage of the wireless power system is greater than the predetermined voltage threshold.

Figure 10:
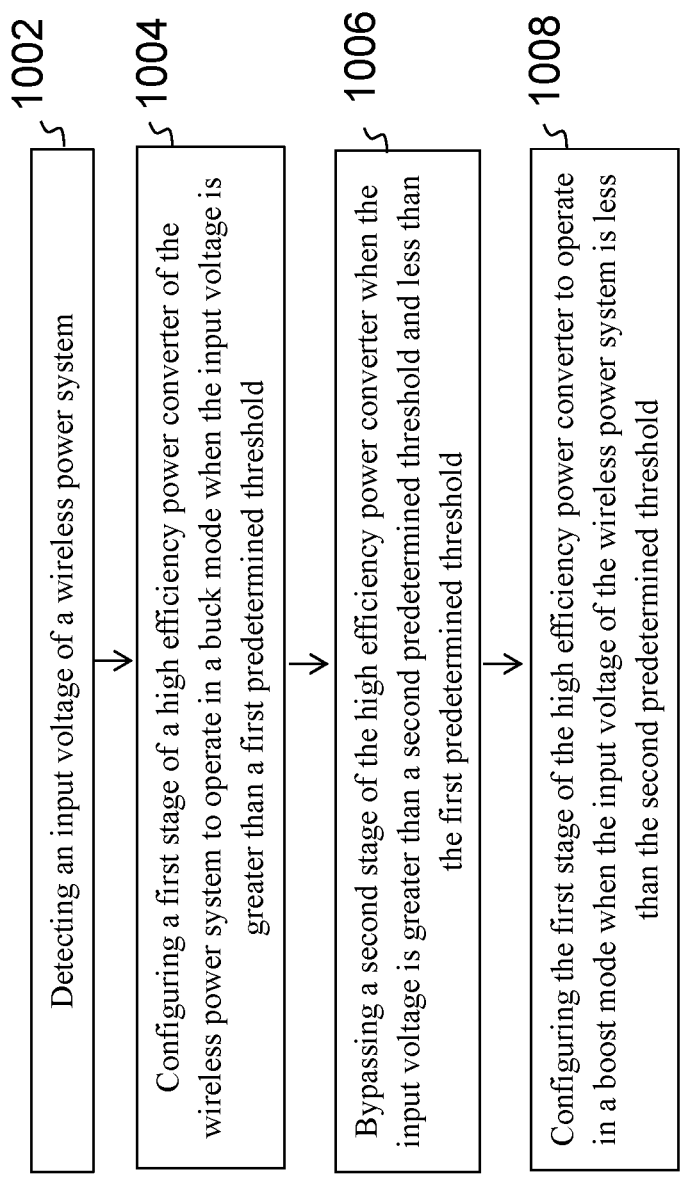
FIG. 10 illustrates a flow chart of applying a low input voltage control mechanism to the high efficiency converter shown in FIG. 2 in accordance with various embodiments of the present disclosure.

FIG. 10 illustrates a flow chart of applying a low input voltage control mechanism to the high efficiency converter shown in FIG. 2 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

A receiver of a wireless power system comprises a high efficiency power converter. The high efficiency power converter comprises a first stage 202 and a second stage 204 connected in cascade. The first stage 202 is employed to charge a battery and the second stage 204 is employed to provide isolation between the first stage 202 and the battery.

In some embodiments, the first stage 202 is implemented as a four-switch buck-boost converter as shown in FIG. 7. The second stage 204 is implemented as a charge pump converter as shown in FIG. 3.

At step 1002, an input voltage of the receiver of the wireless power system is detected by a suitable sensing apparatus or a plurality of sensing devices. The detected voltage is processed by a controller. In particular, the detected voltage is compared with predetermined voltage thresholds.

At step 1004, the first stage 202 is configured to operate in a buck converter mode when the input voltage of the wireless power system is greater than a first predetermined voltage threshold.

At step 1006, when the input voltage is greater than a second predetermined voltage threshold and less than the first predetermined voltage threshold, the charge pump power converter does not function as a voltage divider. Instead, the charge pump power converter provides a direct conduction path between the first stage 202 and the battery.

At step 1008, the first stage 202 is configured to operate in a boost converter mode when the input voltage of the wireless power system is less than the second predetermined voltage threshold.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:
a transmitter circuit coupled to an input power source;
a transmitter coil coupled to the transmitter circuit;
a receiver coil magnetically coupled to the transmitter coil;
a rectifier coupled to the receiver coil and configured to convert an alternating current voltage into a direct current voltage; and
a high efficiency power converter comprising a first stage and a second stage connected in cascade between the rectifier and a battery, wherein the first stage is configured to charge the battery, and the second stage is configured to provide isolation between the first stage and the battery.

2. The system of claim 1, wherein:
the first stage is a step-down power converter configured to operate in multiple modes for charging the battery; and
the second stage is an isolation switch configured to provide the isolation between the first stage and the battery.

3. The system of claim 1, wherein:
the first stage of the high efficiency power converter is configured to operate in a current control mode to charge the battery when an output voltage of the system is less than a predetermined voltage threshold.

4. The system of claim 3, wherein:
the first stage of the high efficiency power converter is configured to operate in a voltage control mode to charge the battery when the output voltage of the system is greater than the predetermined voltage threshold.

5. The system of claim 1, wherein the first stage is implemented as a hybrid converter comprising:
a first switch, a capacitor and a second switch connected in series between an output of the rectifier and an output filter comprising an inductor and a capacitor;
a third switch connected between a common node of the first switch and the capacitor, and a common node of the second switch and the output filter; and
a fourth switch connected between a common node of the capacitor and the second switch, and ground.

6. The system of claim 1, wherein the first stage is implemented as a buck-boost converter comprising:
a first switch and a second switch connected in series between an output of the rectifier and ground;
a third switch and a fourth switch connected in series between an output of the first stage and ground; and
an inductor coupled between a common node of the first switch and the second switch, and a common node of the third switch and the fourth switch.

7. The system of claim 1, further comprising:
a power converter coupled between the input power source and the transmitter circuit.

8. A method comprising:
detecting an output voltage of a high efficiency power converter, wherein the high efficiency power converter comprises a first stage and a second stage connected in cascade;
applying a current control mode to the first stage and configuring an output current of the first stage within a predetermined current range when the output voltage is less than a predetermined output voltage threshold; and
applying a voltage control mode to the first stage and configuring an output voltage of the first stage within a predetermined voltage range when the output voltage is greater than the predetermined output voltage threshold.

9. The method of claim 8, wherein:
the first stage is a step-down power converter configured to operate in various operating modes for charging a battery connected to the high efficiency power converter; and
the second stage is a charge pump converter configured as a voltage divider.

10. The method of claim 8, wherein:
the first stage is a step-down power converter configured to operate in various operating modes for charging a battery connected to the high efficiency power converter; and
the second stage is an isolation switch.

11. The method of claim 8, wherein:
the high efficiency power converter is connected to a receiver coil through a rectifier.

12. The method of claim 11, wherein:
the receiver coil comprises a first coil and a second coil connected in series; and
the rectifier comprises a first diode and a second diode, and wherein:
the first diode and the first coil are connected in series;
the second diode and the second coil are connected in series; and
a common node of the first diode and the second diode is connected to an input of the high efficiency power converter.

13. The method of claim 8, wherein:
the first stage is a four-switch buck-boost power converter connected to a rectifier; and
the second stage is a charge pump converter.

14. The method of claim 13, further comprising:
configuring the four-switch buck-boost power converter to operate in a buck converter mode when an output voltage of the rectifier is greater than a first rectifier output voltage threshold;
configuring the charge pump converter to operate in a bypassing mode when the output voltage of the rectifier is less than the first rectifier output voltage threshold and greater than a second rectifier output voltage threshold; and
configuring the four-switch buck-boost power converter to operate in a boost converter mode when the output voltage of the rectifier is less than the second rectifier output voltage threshold.

15. The method of claim 8, further comprising:
configuring the high efficiency power converter to charge a battery connected to a receiver of a wireless power transfer system.

16. The method of claim 8, wherein:
the predetermined current range has a current resolution of less than 400 mA; and
the predetermined voltage range has a voltage resolution of less than 40 mV.

17. A system comprising:
a receiver coil configured to be magnetically coupled to a transmitter coil;
a rectifier connected to the receiver coil; and
a high efficiency converter connected between the rectifier and a battery, wherein the high efficiency converter comprises a first stage and a second stage connected in cascade, and wherein the first stage configured to operate in various operating modes for charging the battery and the second stage configured to provide isolation between the first stage and the battery.

18. The system of claim 17, wherein:
the receiver coil comprises a first coil and a second coil connected in series; and
the rectifier is a center tapped rectifier connected to the first coil and the second coil.

19. The system of claim 17, wherein:
the first stage is a step-down power converter configured to operate in either a voltage control mode or a current control mode for charging the battery; and
the second stage is a charge pump power converter configured to function as a voltage divider.

20. The system of claim 17, wherein:
the first stage is a four-switch buck-boost power converter connected to a rectifier; and
the second stage is an isolation switch.

* * * * *